June 30, 1925. 1,544,031
C. G. POLLEYS
WAVE MOTOR
Filed June 8, 1923 3 Sheets-Sheet 3

Inventor
Charles G. Polleys
Attorney.

Patented June 30, 1925.

1,544,031

UNITED STATES PATENT OFFICE.

CHARLES G. POLLEYS, OF WEST SOMERVILLE, MASSACHUSETTS.

WAVE MOTOR.

Application filed June 8, 1923. Serial No. 644,162.

*To all whom it may concern:*

Be it known that I, CHARLES G. POLLEYS, a citizen of the United States, residing at West Somerville, in the county of Middlesex and State of Massachusetts, have invented certain new and useful Improvements in Wave Motors, of which the following is a specification.

This invention relates to wave motors and has for an object to provide improved means for employing the movement of water under the action of the wind or other causes producing waves, swells or the like.

A further object of the invention is to provide a buoyant float adapted to rise and fall with the rise and fall of the water and to convert such rising and falling motion into rotary motion by new and improved means.

A further object of the invention is to couple with said conversion of the rise and fall the rotation of the float in opposite directions according to the incoming and outgoing wave motion and to convert said motion into rotary motion to add to the rotary motion produced by the rise and fall.

A further object of the invention is to provide a float of the general type of a scow or barge which shall rise and fall with the swell with means for converting the rising and falling motion of the barge into rotary motion to be added to the rotary motion produced by the rise and fall of the float and the rotation of the float as hereinbefore mentioned.

A further object of the invention is to provide a new and improved type of pendulum weight within the buoyant rotating float for moving the float downwardly with the receding of the buoyant effect of the water.

With these and other objects in view, the invention comprises certain novel elements, units, parts, combinations, mechanical movements, interactions, connections and functions, as disclosed in the drawings together with mechanical and functional equivalents thereof as will be hereinafter more fully described and claimed.

In the drawings:

Figure 4 is a longitudinal diametrical sectional view through the revolving float showing the pendulum weight therein.

Figure 5 is a detail sectional view of part of the gearing structure.

Like characters of reference indicate corresponding parts throughout the several views.

Figure 1:
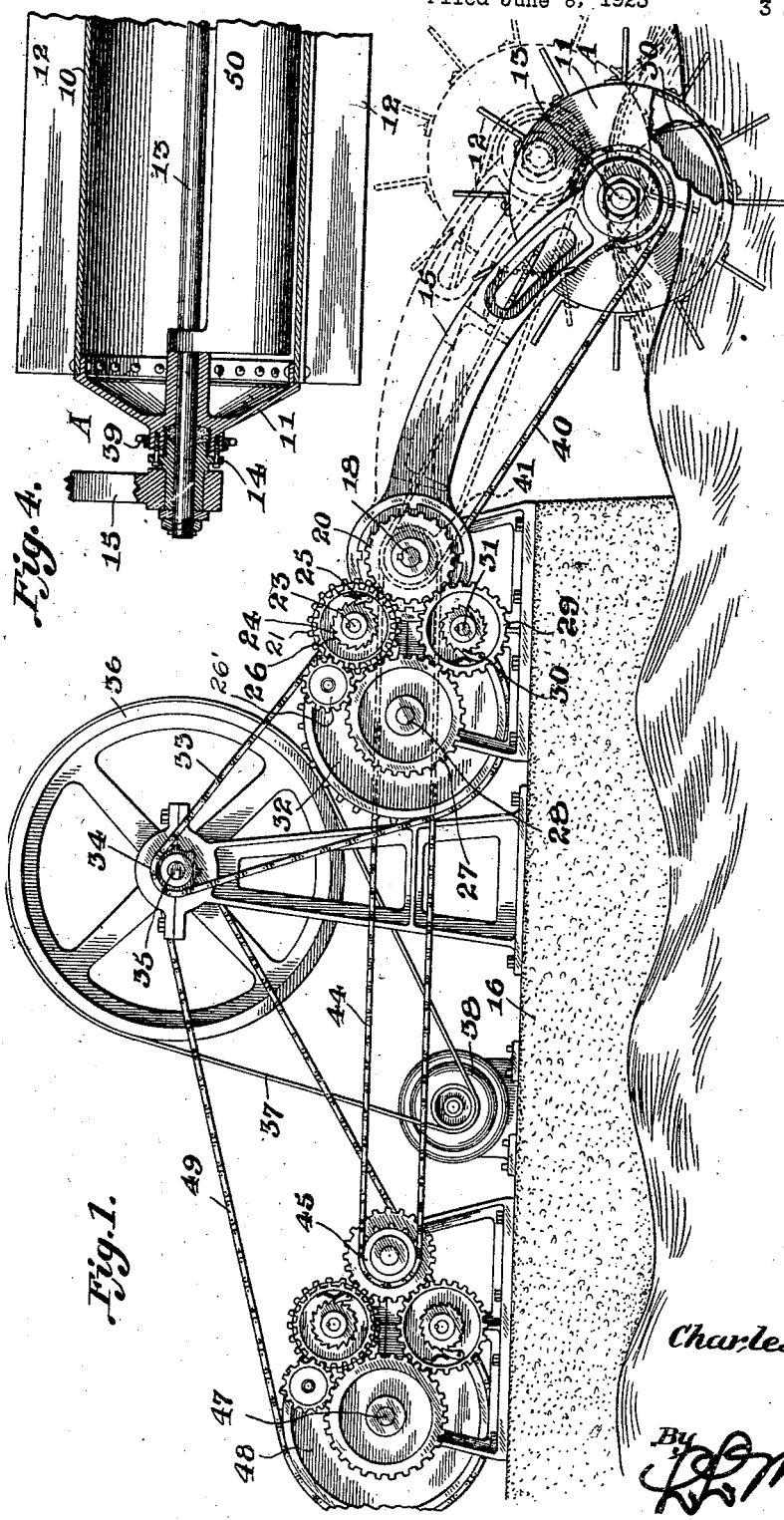
Figure 1 is a view in side elevation of one embodiment of the present invention mounted upon a stationary pier.
Figure 2:
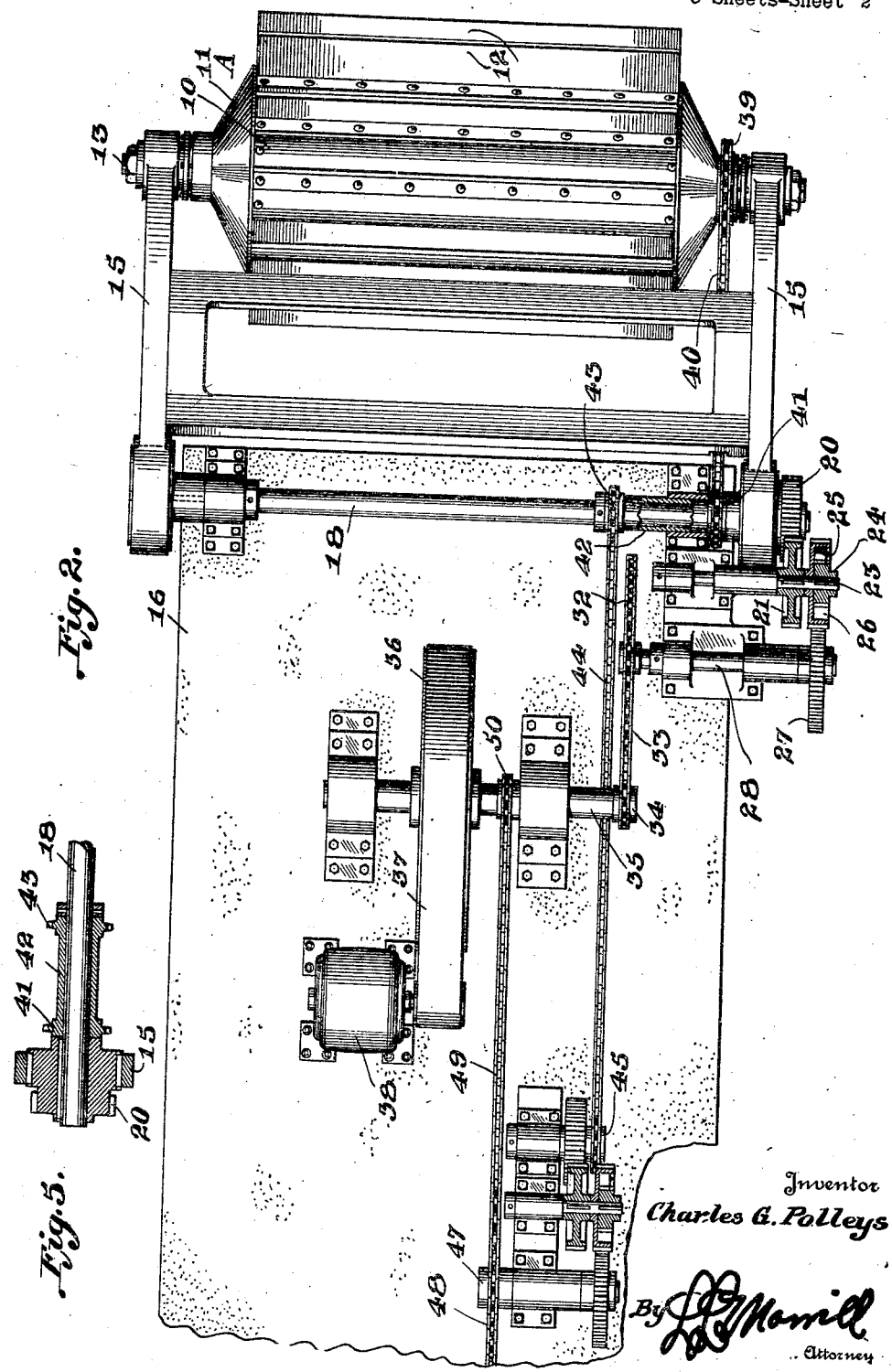
Figure 2 is a top plan view of the type of invention shown at Figure 1.
Figure 3:
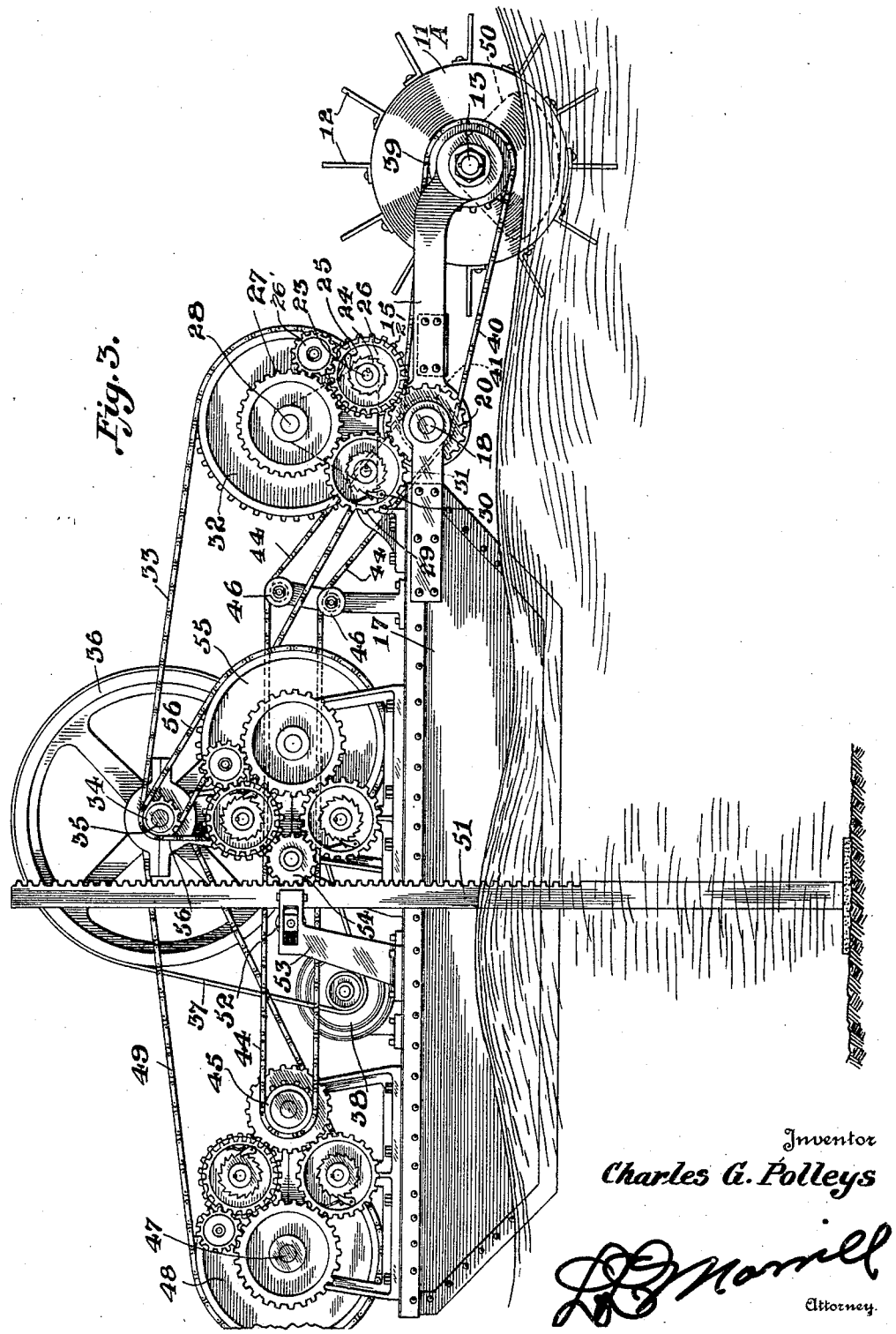
Figure 3 is a view in side elevation of the invention mounted upon a floating barge.

The improved wave motor which forms the subject matter of this application comprises a plurality of operative parts, one of which is a rotating float, indicated as an entirety at A. This float A comprises a cylindrical drum or barrel 10 having tapered conical ends 11 with fins or paddles 12 spaced about its perimeter and extending radially therefrom. This barrel is mounted upon a shaft 13 and to maintain its buoyancy a stuffing box or gland 14 is provided as shown more particularly at Figure 4. It is mounted for operative purposes upon arms 15 which said arms are fulcrumed to the supporting structure which in the type shown at Figures 1 and 2 is a stationary pier 16 and in the type shown at Figure 3 is a floating barge 17. This fulcruming is preferably by way of a shaft 18 to which the arms 15 are rigidly attached so that the shaft 18 oscillates with the rise and fall of the barrel 10.

To convert this oscillating motion of the shaft 18 into rotary motion, the shaft is provided with a gear 20 engaging a gear 21 (see Figure 2), rigidly mounted upon a stub shaft 23. This shaft 23 carries a ratchet hub 24 engaging a spring-pressed pawl 25 carried by a gear wheel 26. This gear wheel 26 intergears with a gear wheel 27 carried upon the shaft 28 through the medium of the idler 26'.

A second gear train connects gear 20 and 27, there being a gear wheel not shown meshing with gear 20 which is mounted upon the stub shaft 31 which in turn is connected by pawl and ratchet 30 to gear 29 in a manner similar to the first gear train described except for the omission of the idler 26' so that, as the barrel A falls, the motion is converted into a clockwise rotary motion of shaft 28 by the gear 29 and, as it rises, it is converted into similar motion of shaft 28 by the gear 26.

From the shaft 28 gearing to any source of use and of any type is employed. As here shown, a sprocket wheel 32 is carried upon said shaft with a sprocket chain 33 running to a sprocket 34 upon the shaft 35 which in turn carries a pulley 36 with belt 37 running to a conventional motor 38. It is to be understood, however, that the invention is in no way limited to the train of gearing whether by sprocket or other well known type of stepping up the rotary motion from the shaft 28.

To convert the reversely rotating motion of the barrel A into continuous rotary motion, a sprocket 39 is mounted upon the barrel A with a sprocket chain 40 running to a sprocket 41 upon a sleeve 42 rotating freely upon the shaft 18. A second sprocket 43 is carried by the sleeve so that the sprocket chain 44 from said sleeve operates the sprocket 45. In the type shown at Figure 3, it is necessary to carry this sprocket chain 44 over idlers 46, but it is obvious that the path of the chain will be determined by the intervening structure.

The sprocket 45 forms a part of a motion converting mechanism substantially identical to that hereinbefore described whereby continuous rotary motion is imparted to the shaft 47 carrying the sprocket 48 from which the chain 49 extends to a sprocket 50 carried also upon the shaft 35 so that the oscillating rotary motion of the barrel by the inflow and outflow of the waves is converted into continuous rotary motion and added to the continuous rotary motion produced by the rise and fall of the barrel.

Irrespective of the type supporting structure, the barrel is provided with a pendulum weight 50 swung upon the shaft 13 within the barrel, clear of the barrel so that the latter is free to rotate unhampered by the contained pendulum weight.

In the type of the device shown at Figure 3, an added motion is converted in that barge 17 is anchored or secured by means of struts or racks 51 which may be as convenience dictates upon one or both sides of the barge. Means for accommodating the rise and fall of the barge relative to the racks 51 is provided by rollers 52 carried by uprights 53 holding the rack 51 in engagement with the gear 54. This gear 54 forms a part of a motion converting mechanism similar to the two converting mechanisms previously described, whereby continuous rotary motion is imparted to the sprocket 55 from which a chain 56 leads to a sprocket upon the shaft 35.

It is well known that the physical characteristics of waves vary greatly with the condition of the wind or other governing features; sometimes being very short and choppy, at other time long, and at still other times amounting only to swells. The present motor is intended to act with any of the said water conditions, the rising and falling of the barrel being more especially intended for the choppy waves, the longer waves acting more often in rotating the barrel, whereas the swells will raise and lower the barge while acting but little upon the rotating barrel. The device, therefore, embodies means for obtaining power from the movement of the water irrespective of whether the water has violent motion or only gently moving.

It is believed that from the foregoing description of the construction and interaction of several parts, the operation of the device under any condition of wave motion will be readily understood.

What I claim to be new and desire to secure by Letters Patent is:

1. A wave motor embodying a buoyant rotating float, means to take off motion from the rise and fall of the float and the rotation of the float, means to convert each of said motions separately into continuous rotary motion, and means to combine the continuous rotary motion of both.

2. A wave motor embodying a hollow cylindrical buoyant float having fins extending radially from its perimeter, means to take off oscillating motion from the rise and fall of the float, means to take off oscillating motion from the rotary movement of the float, means to convert each of said motions independently into continuous rotary motion, and means to combine the rotary motions of both.

3. A wave motor comprising a hollow cylindrical float having radial fins extending from its perimeter, and a pendulum weight suspended from its axis within the float.

4. A wave motor embodying a hollow buoyant member, circular in cross section and provided with fins extending radially from its perimeter, a weight carried by the axis of the float, and held out of engagement with the rotary movement of the float, and means to take off rotary motion of the float.

5. A wave motor comprising a floating structure, motion converting mechanism mounted upon the structure, stationary racks positioned to actuate the converting mechanism with the rise and fall of the structure, and a float attached to the floating structure and independently actuated by the waves, a second converting mechanism, and means connecting the auxiliary float with the second converting mechanism and adding the resultant motion to the resultant motion of the first mentioned converting mechanism.

6. A wave motor comprising a vessel, upstanding racks maintaining the vessel in fixed horizontal position but permitting rise and fall, a converting mechanism carried upon the vessel and intergeared with the rack adapted to convert the rising and falling motion into continuous rotary motion, a floating, rotating auxiliary chamber articulated to the vessel, means to convert the rise and fall of the auxiliary float into rotary motion, means to add said rotary motion to the rotary motion first mentioned, an additional motion converting mechanism, means to connect the vessel to said last mentioned converting mechanism to convert the rotary movement of said auxiliary float into continuous rotary motion, and means to add said continuous rotary motion to the rotary motion already provided by the aforementioned converting mechanism.

7. The combination with a support, of a gear journaled on the support, a buoyant chamber provided with fins, an arm journaling at one end the buoyant chamber and at its other end connected with the gear, a pair of pinions driven by said gear, oppositely-actuated ratchet mechanisms actuated by said pinion, a wheel driven from said ratchet mechanisms continuously in the same direction, a second gear journaled on the support, power transmission mechanism connecting the buoyant chamber with and to actuate said last mentioned gear alternately in opposite directions, and similar oppositely-acting ratchet mechanisms similarly driving said wheel.

8. The combination with a floating support, of a gear journaled on the support, a buoyant chamber provided with fins, an arm journaling at one end the buoyant chamber and at its other end connected with the gear, a pair of pinions driven by said gear, oppositely-acting ratchet mechanisms actuated by said pinions, a wheel driven from said ratchet mechanisms continuously in the same direction, a second gear journaled on the support, power transmission mechanism connecting the buoyant chamber with and to actuate said last mentioned gear alternately in opposite directions, similar oppositely acting ratchet mechanisms similarly actuated by said gear and similarly driving said wheel, another gear journaled upon said support, similar oppositely acting ratchet mechanisms actuated from the rise and fall of said support, power transmission mechanism extending from said ratchet mechanisms to and driving said wheel.

In testimony whereof I affix my signature.

CHARLES G. POLLEYS.